(12) United States Patent
Sandblom et al.

(10) Patent No.: US 10,850,770 B2
(45) Date of Patent: Dec. 1, 2020

(54) DEVICE AND A METHOD FOR REVERSING AN ARTICULATED VEHICLE COMBINATION

(71) Applicant: VOLVO TRUCK CORPORATION, Gothenburg (SE)

(72) Inventors: Fredrik Sandblom, Mölndal (SE); Leo Laine, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 198 days.

(21) Appl. No.: 15/755,204

(22) PCT Filed: Sep. 2, 2015

(86) PCT No.: PCT/EP2015/070084
§ 371 (c)(1),
(2) Date: Feb. 26, 2018

(87) PCT Pub. No.: WO2017/036526
PCT Pub. Date: Mar. 9, 2017

(65) Prior Publication Data
US 2020/0180691 A1   Jun. 11, 2020

(51) Int. Cl.
*B62D 13/06*     (2006.01)
*B60W 10/20*     (2006.01)
(Continued)

(52) U.S. Cl.
CPC .............. *B62D 13/06* (2013.01); *B60W 10/20* (2013.01); *B60W 30/18036* (2013.01);
(Continued)

(58) Field of Classification Search
USPC .......................................................... 701/42
See application file for complete search history.

(56) References Cited

U.S. PATENT DOCUMENTS 9,290,203 B2 *   3/2016   Lavoie ................... B62D 13/06
2008/0027581 A1   1/2008   Saether et al.
(Continued)

FOREIGN PATENT DOCUMENTS

CN    103228525 A    7/2013
DE    102005043466 A1    3/2007
(Continued)

OTHER PUBLICATIONS

A. Gonzalez-Cantos and A. Ollero, Backing-Up Maneuvers of Autonomous Tractor-Trailer Vehicles using the Qualitative Theory of Nonlinear Synamical Systems, Grupo De Robotica, Vision y Control, Departmento de ingenieria De Sistemas y Automatiuca Camino de los Descubrimientos, pp. 49-65.*
(Continued)

*Primary Examiner* — Tyler D Paige
(74) *Attorney, Agent, or Firm* — Venable LLP; Jeffri A. Kaminski

(57) ABSTRACT

A device for reversing an articulated vehicle combination that has at least two vehicle units interconnected via at least one articulated join includes an arrangement for recording and storing a plurality of global positions of a local position of the vehicle combination, at least one sensor, mounted on the vehicle combination, for recording data representing a plurality properties of the surroundings, and a control unit arranged to determine, based at least partly on a plurality of dimensions of the vehicle combination, a set of global positions recorded when the vehicle combination is moving forward, and a set of data representing properties of the surroundings recorded during the forward movement, vehicle control input data for control of the vehicle combination during a reverse movement of the vehicle combination.

34 Claims, 5 Drawing Sheets

(51) Int. Cl.
  *G06K 9/00* (2006.01)
  *B60W 30/18* (2012.01)
(52) U.S. Cl.
  CPC ... *B60W 2300/14* (2013.01); *B60W 2420/403* (2013.01); *B60W 2520/22* (2013.01); *B60W 2530/201* (2020.02); *B60W 2552/05* (2020.02); *B60W 2556/60* (2020.02); *G06K 9/00791* (2013.01)

(56) References Cited

U.S. PATENT DOCUMENTS

| | | | |
|---|---|---|---|
| 2014/0088824 A1* | 3/2014 | Ishimoto | B60R 1/00 701/34.4 |
| 2014/0218522 A1 | 8/2014 | Lavoie et al. | |
| 2014/0257621 A1 | 9/2014 | Zych | |
| 2015/0066296 A1 | 3/2015 | Trombley et al. | |
| 2015/0198949 A1* | 7/2015 | Boos | G06F 3/04883 701/2 |
| 2016/0039342 A1* | 2/2016 | Jones | H04N 7/181 348/148 |
| 2016/0039343 A1* | 2/2016 | Jones | H04N 7/181 348/140 |
| 2016/0114831 A1* | 4/2016 | Laine | B62D 13/06 701/41 |
| 2018/0040129 A1* | 2/2018 | Dotzler | B60R 11/04 |
| 2018/0057052 A1* | 3/2018 | Dodd | G01D 5/16 |
| 2018/0134209 A1* | 5/2018 | Cremona | B60R 21/01 |

FOREIGN PATENT DOCUMENTS

| | | |
|---|---|---|
| DE | 102008043675 A1 | 5/2010 |
| GB | 2398050 A | 8/2004 |
| GB | 2398050 B | 3/2006 |
| JP | 2007-237930 A | 9/2007 |
| JP | 2008-507710 A | 3/2008 |
| JP | 2011-118890 A | 6/2011 |
| JP | 2014-520712 A | 8/2014 |
| WO | 2014174037 A1 | 10/2014 |
| WO | 2014185828 A1 | 11/2014 |
| WO | 2015001054 A2 | 7/2015 |

OTHER PUBLICATIONS

Chinese Office Action and Search Report dated Feb. 3, 2020 in corresponding CN Application No. 201580082787.3, 12 pages.
International Search Report (dated Apr. 13, 2016) for corresponding International App. PCT/EP2015/070084.
Extended European Search Report dated Oct. 12, 2020 in corresponding Europe Patent Application No. 20178905.4, 11 pages.

* cited by examiner

DEVICE AND A METHOD FOR REVERSING AN ARTICULATED VEHICLE COMBINATION

BACKGROUND AND SUMMARY

The invention relates to a device and a method for reversing an articulated vehicle combination comprising at least two vehicle units interconnected via at least one articulated joint.

The invention can be applied to any suitable vehicle combination, for example including cars, or heavy-duty vehicles, such as trucks and buses. Examples of vehicle combinations to which the invention is applicable are provided below.

Driving articulated vehicle combinations in reverse may present difficulties for drivers of such vehicle combinations. For example, where a driver has controlled the vehicle combination so as to turn from a road into an area with restricted areas for the vehicle combination to move on. It might not be possible to turn the vehicle combination around, and to get out of the area, the vehicle combination may have to be moved in reverse.

WO2014185828A1 describes a method for assisting the reversal movement of an articulated vehicle, comprising recording and saving, as the articulated vehicle moves forward along a path, positions and articulation angles of the articulated vehicle, e.g. with the Global Positioning System (GPS) and articulation sensors. A swept area of the articulated vehicle is calculated using the recorded values and size information of the articulated vehicle. The swept area is used to control the steering of the articulated vehicle when reversing the articulated vehicle along the path.

Although this method has advantages, there could be situations, where difficulties are presented in attempts to reverse the articulated vehicle along the path. For example, during the reversing, the actual swept area may extend outside of the calculated reverse area.

It is desirable to improve the assistance of the reversal movement of an articulated vehicle combination.

According to an aspect, the invention provides a device for reversing an articulated vehicle combination comprising at least two vehicle units interconnected via at least one articulated joint, comprising means for recording and storing a plurality of global positions of a local position of the vehicle combination, characterized in that the device comprises at least one sensor, mounted on the vehicle combination, for recording data representing a plurality properties of the surroundings, and a control unit arranged to determine, based at least partly on a plurality of dimensions of the vehicle combination, a set of global positions recorded when the vehicle combination is moving forward, and a set of data representing properties of the surroundings recorded during said forward movement, vehicle control input data for control of the vehicle combination during a reverse movement of the vehicle combination.

The global positions may be fixed in relation to the surroundings and the local position may be fixed in relation to one of the vehicle units. More specifically, the global positions may be fixed in a coordinate system which is fixed in relation to the surroundings and the local position may be fixed in a coordinate system which is fixed in relation to one of the vehicle units. For example, the local position may be a position at a rearmost axle of the vehicle combination. Alternatively, other position of vehicle combination may serve as the local position. Where the local position is a position on a towed vehicle unit of the vehicle combination, as exemplified below, positions may be determined for a location on a towing vehicle unit of the vehicle combination, and the global positons for the local positon may be determined by calculations based on the towing vehicle positions and measured angles of the at least one articulated joint.

By the provision of a device comprising said sensor and control unit, the assistance of the reversal movement of an articulated vehicle combination may be considerably improved.

For example, the invention provides an improvement of the solution in WO2014185828, since it may address challenges arising from the fact that the swept area for forward driving of a vehicle combination is different from swept area reverse driving. For an illustration of the challenges addressed, a trailer of a forwards moving vehicle combination with only two vehicle units may be compared to a pendulum, which will be stable and biased by gravity towards a vertical position with a fixed articulation joint. However, when the vehicle combination moved rearwards, the trailer will behave like an elongated object supported only at its lower end with an articulated joint. Thereby, the joint needs sideways movements to counteract tendencies of the object to fall over. In a similar way the steering of the towing vehicle needs to be actuated to counteract tendencies of the trailer to move away from the desired path. The problem will be aggravated in a vehicle unit with three or more vehicle units.

The sensor mounted for recording data representing properties of the surroundings, and the control unit arranged to determine, based partly on the recorded properties of the surroundings, the vehicle control input data for control during the reverse movement, makes it possible to take into consideration a reverse driving swept area which is different from the forward driving swept area. More specifically, taking the properties of the surroundings into consideration makes it possible to establish limitations for the reverse driving swept area which may extend beyond the forward driving swept area.

It should be noted that the reverse movement of the vehicle combination may be continuous, or interrupted. In addition, an interruption may include a forward movement. For example, in order to reverse past a certain interval of the intended path, for example with a narrow bend, a first reverse movement of the vehicle combination with control by the vehicle control input data could be followed by a forward movement, shorter than the first reverse movement, which in turn is followed by a second reverse movement. Such an intermediate forward movement may provide a discontinuation of a path for the reverse movement which may for example allow the vehicle to pass through a narrow bend.

Taking the properties of the surroundings recorded during the forward movement into consideration also makes it possible to obtain very recent information about obstacles, such as parked vehicles, recorded on the sides of the forward movement path of the vehicle combination.

The surroundings may be a region in the vicinity of the vehicle, the properties of which are recordable by a sensor of a type as exemplified herein. The device for reversing an articulated vehicle combination may include means for storing the recorded data representing the properties of the surroundings. Such means may in some embodiments be arranged to store data derived or extracted from the recorded data representing the properties of the surroundings. Where the amount of recorded data is large, deriving or extracting data for data storage, the amount of data to be stored may be reduced, which can save data storage space.

The control unit may be arranged so that, where an earliest recorded one of the stored global positions was recorded at a beginning of a first time interval and a latest recorded one of the stored global positions was recorded at an end of the first time interval, said properties of the surroundings are recorded within the first time interval.

It is understood that the vehicle combination may be of a variety of types. One vehicle unit may be a vehicle in the form of a towing vehicle, e.g. a truck arranged to tow a full trailer, or a tractor for a semitrailer. The vehicle combination may include one or more towed vehicle units. The vehicle units may be interconnected one after the other via the at least one articulated joint. Further examples of vehicle combinations are given below.

In some embodiments, the control unit is arranged to determine a travelled path based on the set of global positions, and to determine the vehicle control input data partly based on the travelled path. Thereby, in cases where the global positions are determined with intermediate time intervals, which may be constant and/or predetermined, the data for the determination of the vehicle control input data may be improved by being provided in a continuous line forming the determined travelled path.

In advantageous embodiments, where the control unit is arranged to determine a swept area of the vehicle combination based at least on the set of global positions, and to determine the vehicle control input data partly based on the swept area, the control unit may be arranged to simulate a reverse movement of the vehicle combination, and to determine the swept area partly based on the simulated reverse movement. The simulated reverse movement may be such that the local position moves along the global positions. Such a simulation makes it possible to take into further consideration said phenomenon that the swept area during reverse movement differs from the swept area during forward movement. More specifically, the simulated reverse movement may provide a more accurate depiction of the behaviour of the vehicle combination, than a recording of the forward movement.

Advantageously, the control unit may be arranged to determine a drivable area or at least one limitation of a drivable area based at least on the set of global positions and the set of data representing properties of the surroundings, and to determine the vehicle control input data partly based on the drivable area or the at least one limitation of the drivable area. Thereby, the accuracy of the vehicle control input data may be improved, since data from the recorded properties of the surrounds, e.g. grass, asphalt, obstacles, are transferred into a limitation, the drivable area, which is easily assessable to the control unit, when simulating the reverse movement. The at least one limitation of the drivable area can be point, or a line provided as a results e.g. of connecting or interpolating determined points of limitations. As also suggested above, compared to raw data on the surroundings from the sensor, such points will require only a small amount of data storage space, and therefore data can be saved over long driving distances without need for excessive data storage capacity.

Preferably, the control unit is arranged to determine whether the swept area exceeds the drivable area, or to determine whether the swept area interferes with, or overlaps, at least one of the at least one drivable area limitation. The control unit may be arranged to determine whether the swept area exceeds the drivable area, or to determine whether the swept area interferes with at least one of the at least one drivable area limitation, the control unit further being arranged to adjust the simulated reverse movement or to simulate a different reverse movement if the swept area exceeds the drivable area or if the swept interferes with at least one of the at least one drivable area limitation. Thereby, the reverse movement assistance is further improved since the simulated reverse movement is adjusted if the determined swept area interferes with the drivable area limitations. This makes it possible to find a reverse driving strategy by iterations of swept area determinations and simulated movements in view of the drivable area.

The different simulated reverse movement may be along a smooth, continuous line. However, in some examples the different simulated reverse movement may be divided into two or more parts. Consecutive parts of the simulated reverse movement may be connected by a forward movement. As exemplified above, in order to reverse past a certain interval of the intended path, for example with a narrow bend, a first reverse movement of the vehicle combination with control by the vehicle control input data could be followed by a forward movement, shorter than the first reverse movement, which in turn is followed by a second reverse movement.

In some embodiments, the control unit is arranged to determine a drivable path width based at least on the set of global positions and the set of data representing properties of the surroundings, and to determine the vehicle control input data partly based on the drivable path width. Thereby, values may be provided of a parameter which is readily available for determination of vehicle control input data as a clear indication of drivable area limitations. The drivable path width could for example be the shortest distance between driveable area limits intersecting a global position, or a travelled path as mentioned above.

The device for reversing the vehicle combination may comprise means for recording a plurality of articulation angles of each articulated joint, wherein the control unit is arranged to determine the vehicle control input data partly based on a set of articulation angles. This may further assist in the determination of the vehicle control input data, for example in the determination of the travelled path as mentioned above. The articulation angles may be recorded while the global positions are determined. Further, where the vehicle combination presents a plurality of articulated joints, the articulation angles of separate joints may be recorded simultaneously. In some embodiments, during the real, executed reverse movement, articulation angles may be recorded, and a real swept area during the reverse movement may be determined partly based on the recorded articulation angles.

In some embodiments, the control unit is arranged to determine a set of directions of movement of the local position during said forward movement, and to determine the vehicle control input data partly based on the set of directions of movement. This may further assist in the determination of the vehicle control input data. The directions of movement may be recorded while the global positions are determined.

The control unit may be arranged to control the vehicle combination during the reverse movement of the vehicle combination autonomously or semi-autonomously via at least one actuation device. Such involvement of the control unit may take demands away from a driver of the vehicle combination. It may also secure that a simulated reverse movement used in the determination of the vehicle control input data, is followed closely during execution of the reverse movement.

In some embodiments, the device comprises means for providing, by a visual and/or audible presentation, at least a part of the vehicle control input data to a driver of the vehicle combination. This may provide a beneficial addition to a semi-autonomous control of the control unit, since it may give the driver guidance to follow the vehicle control input data, and to be a part of an effective execution of the reverse movement.

The control unit may comprise a single physical unit, or separate physical units, arranged to communicate with each other in a suitable manner for exchange of control data. Preferably, the control unit is arranged such that functions and parts of it used for the simulated reverse movement(s) are also used for the real, executed reverse movement. For example, the simulated reverse movement may comprise using a control unit function for control of the front wheel steering of a vehicle model, e.g. as exemplified below, and the real, executed reverse movement may comprise using the same control unit function for the control of the front wheel steering of the vehicle combination.

The sensor for recording data representing a plurality properties of the surroundings, may comprise a time-of-flight camera, a stereo camera, a radar a laser scanner and/or two acoustic arrays.

It is understood that in embodiments of the invention, the simulated reverse movement and the swept area may be adjusted in an iterative manner, until a final simulated reverse movement is determined, based on which a final swept area is determined, which does not exceed the drivable area. It should be noted that in some cases no iteration is necessary, and the simulated reverse movement determined first becomes the final simulated reverse movement, since the swept area determined based on said first simulated reverse movement does not exceed the drivable area.

In some embodiments, the vehicle combination comprises a further sensor for recording properties of the surroundings during the reverse movement of the vehicle combination. This might be useful in case an object, such as another vehicle or a person, has moved into the final swept area after the recording of the surroundings during the preceding forward movement. The further sensor might for example be a camera mounted at a rear end of the most rearward vehicle unit of the vehicle combination.

In such embodiments, the control unit is preferably arranged to receive and process signals from the further sensor. The control unit is thereby preferably arranged to determine, based on said signal processing, whether an object is in the final swept area. The control unit may further be arranged to determine whether the object is stationary or moving. The control unit may further be arranged to determine whether the object is on a course such that it is moving out of the final swept area.

The control unit might further be adapted to control the vehicle combination during the reverse movement, based on processing of signals from the further sensor, so as to reduce the speed on the vehicle combination or to stop the vehicle combination. The control unit may further be adapted to adjust the drivable area partly based on the processing of signals from the further sensor, to adjust a remainder of the final simulated reverse movement, and to adjust the final swept area determination based on the adjusted final simulated reverse movement. The iteration described above may thus be repeated, until a finally adjusted simulated reverse movement is provided, partly based on the processing of the signals from the further sensor. It should be noted that such a finally adjusted simulated reverse movement may be preceded, or interrupted, by a forward movement to adjust the position of the vehicle combination as necessary to reach the remainder of the finally adjusted simulated reverse movement.

According to another aspect of the invention, a method is provided for reversing an articulated vehicle combination comprising at least two vehicle units interconnected via at least one articulated joint, comprising storing data representing a plurality of global positions of a local position of the vehicle combination, recorded when the vehicle combination is moving forward, and characterized by the steps of storing a set of data representing a plurality of properties of the surroundings, recorded during said forward movement the vehicle combination by means of at least one sensor mounted on the vehicle combination, and determining, based at least partly on a plurality of dimensions of the vehicle combination, said global positions, and said set of data representing the properties of the surroundings, vehicle control input data for control of the vehicle combination during a reverse movement of the vehicle combination.

The method shares technical effects and advantages with the device described above. Storing data representing a plurality of global positions of a local position of the vehicle combination, may be preceded by receiving or determining such data.

Storing a set of data representing a plurality of properties of the surroundings, recorded during the forward movement may be preceded by receiving such data, or determining such data from raw data from the sensor. As described above, the latter alternative may provide a form of distillation of large data volumes, for better storage capacity utilisation.

Where an earliest of the stored global positions is recorded at a beginning of a first time interval and a latest of the stored global positions is recorded at an end of the first time interval, said properties of the surroundings are preferably recorded within the first time interval. Preferably, said forward movement of the vehicle combination ends at the end of the first time interval, and a reverse movement follows the forward movement without any intermediate movement. It should be noted that the method can be performed without recording the first time interval. For example, time is not necessarily taken into consideration when storing the global positions. Nevertheless, the said properties of the surroundings are preferably recorded within a time interval for storing the global positions. Similarly, time is not necessarily taken into consideration when recording or determining other parameters used in embodiments of the invention, such as articulation angles of each articulated joint, or directions of movement of the local position, but they are preferably nevertheless to the extent that they are part of the invention as embodied, recorded within the first time interval.

According to an aspect of the invention, a computer program comprising program code means for performing the steps of the method is provided. According to an aspect of the invention, a computer readable medium carrying a computer program comprising program code means for performing the steps of the method is provided. According to an aspect of the invention, a control unit for controlling an articulated vehicle combination, the control unit being configured to perform the steps of the method is provided.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
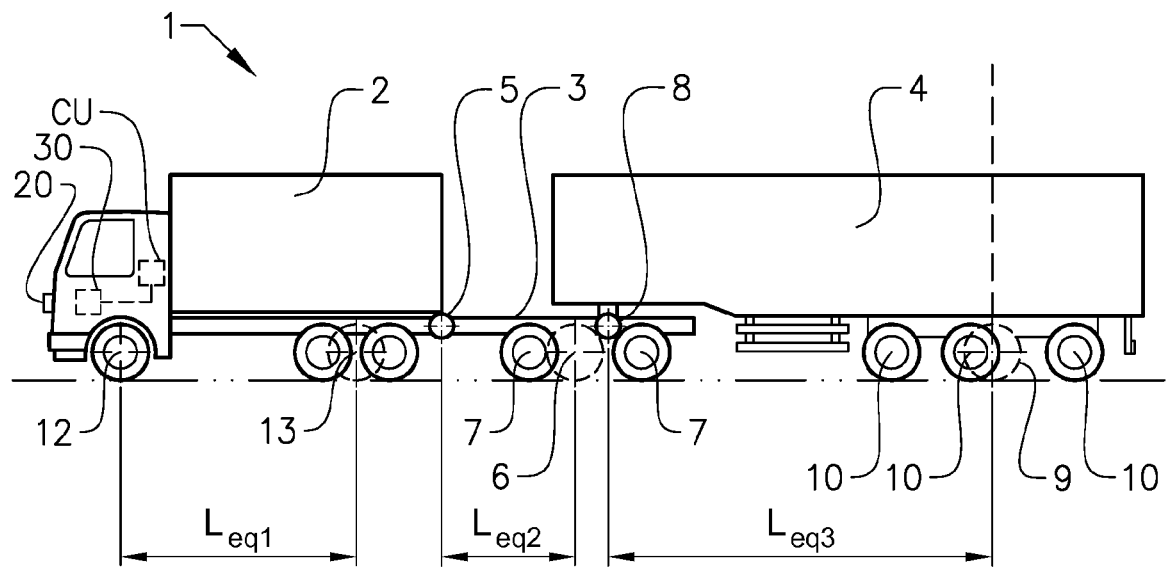
FIG. 1 is a side view of an articulated vehicle combination.

It is to be understood that the present invention is not limited to the embodiments described above and illustrated in the drawings; rather, the skilled person will recognize that many changes and modifications may be made within the scope of the appended claims.

FIG. 1 shows an articulated vehicle combination 1 in the form of a lorry and trailer combination, comprising a first vehicle unit in the form of a towing vehicle 2, and a trailer 3, 4. The vehicle combination comprises a device for reversing the vehicle combination. Said device comprises, in the towing vehicle 2, a control unit CU indicated in FIG. 1 with broken lines. The control unit CU comprises a data storage memory adapted to store a vehicle model, in the form of a simplified single track model, used in this example of the invention to represent the vehicle combination 1. In the model, the trailer 3, 4 is regarded as combination of two vehicle units. More specifically, the trailer comprises second and third vehicle units forming two towed vehicles 3, 4. The first towed vehicle unit 3 is a dolly having a drawbar connected at a first articulation joint 5 to a trailer coupling of the towing vehicle 2. The dolly 3 is provided with two wheel axles 7. The second towed vehicle unit 4 is a semitrailer, which is provided at a second articulation joint 8 with a kingpin that is connected to a fifth wheel coupling of the dolly.

It should be noted though that the invention is applicable to any other type of articulated vehicle combination such as, a car and trailer combination, a bus and trailer combination, a tractor and semitrailer combination, with or without a further trailer behind the semitrailer. Thus, the vehicle combination may include a tractor, a b-link, a semitrailer, a b-double combination, a b-triple combination, or a Nordic combination with a "rigid+dolly semitrailer" or a "rigid truck+centreaxle+centre axle". The vehicle combination may also be an articulated bus having one or two pivoting joints.

The vehicle model includes the effective wheelbase for each vehicle unit 2, 3, 4. The effective wheelbase for each vehicle unit can be determined in advance and stored in the memory of the control unit CU or may be estimated when the vehicle combination is driven forwards. The towing vehicle 2 comprises a front axle 12 and two rear axles; however, for the model the rear axles are replaced by a virtual rear axle 13 located between the real rear axles. An effective wheel base Leq1 of the towing vehicle 2 is the distance from the front axle 12 to the virtual axle 13 of the towing vehicle 2. Further, for the model, the two wheel axles 7 of the dolly 3 is replaced by a virtual axle 6 located between the two real wheel axles 7. The effective wheel base Leq2 of the dolly 3 is the distance from the drawbar connection to the virtual axle 6 of the dolly. In addition, the semitrailer 4 comprises three wheel axles 10, but for the model, the three wheel axles 10 of the semitrailer 4 is replaced by a virtual axle 9. The effective wheel base Leq3 of the semitrailer 4 is the distance from the second articulation joint 8 to the to the virtual rear axle 9 of the semitrailer 4.

Figure 2:
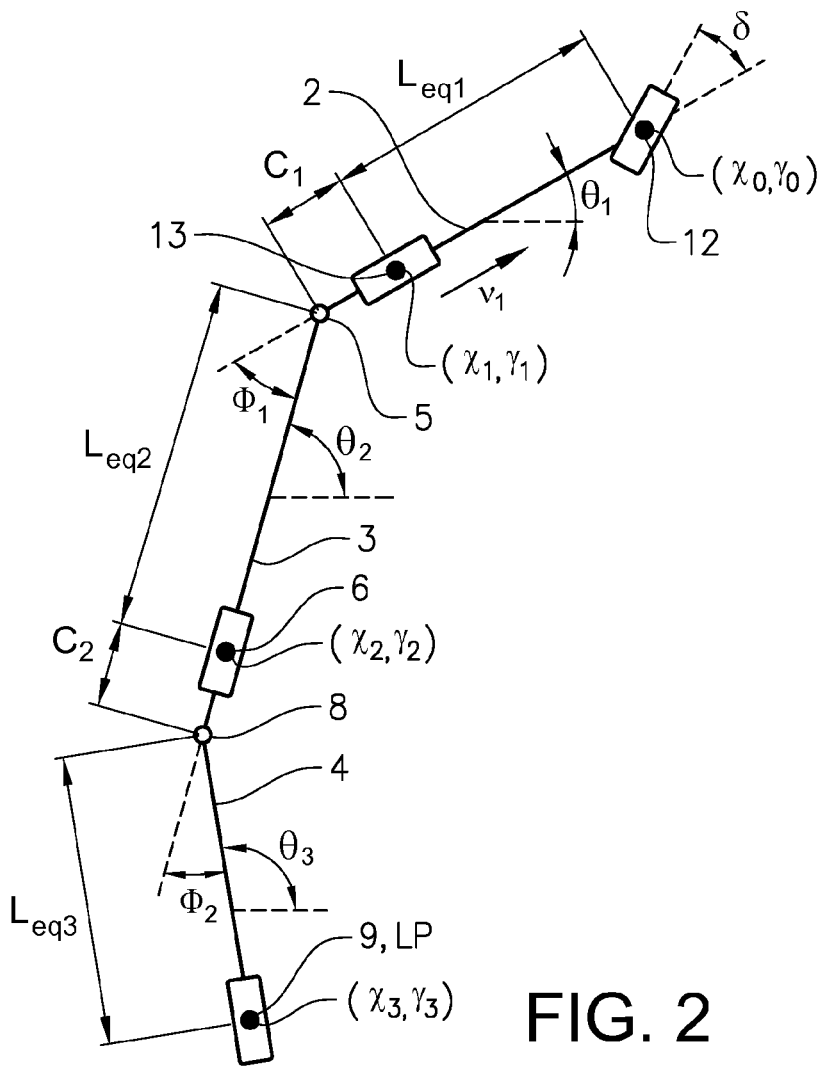
FIG. 2 depicts a model of the vehicle combination in FIG. 1.

FIG. 2 shows the vehicle model, in which the vehicle combination contains three rigid bodies attached by joints which have one rotational degree of freedom. None of the towed vehicle units 3, 4 in this example have any steered axles. However, the invention is of course applicable also to vehicle combinations where one or more towed vehicle units have steered axles, e.g. where the wheels of a semitrailer are steerable.

Figure 3:
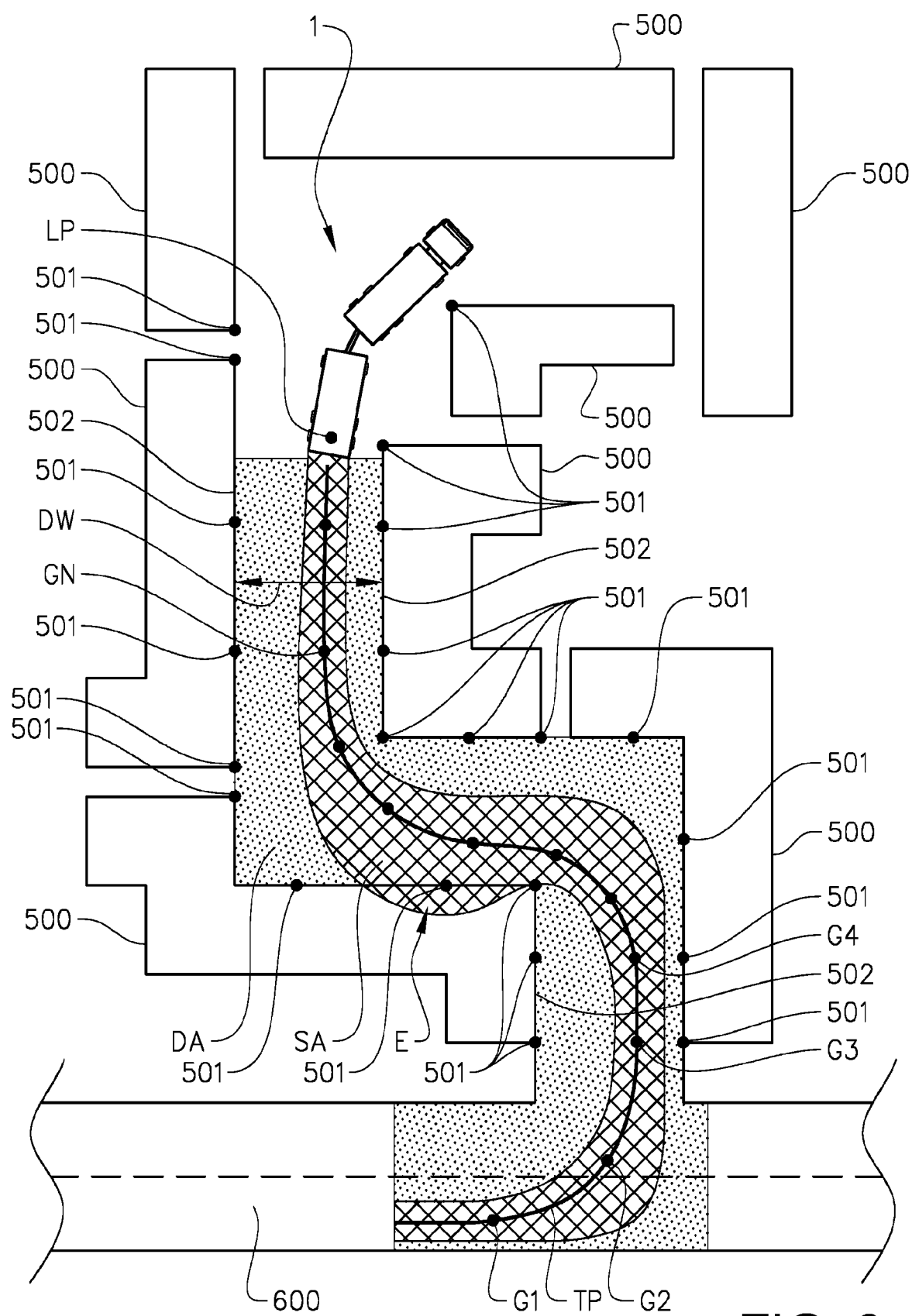
FIG. 3 shows a top view of the vehicle combination in FIG. 1 in an area with buildings.

Reference is made to FIG. 3, showing a top view of an example of a situation where the vehicle combination 1 is in an area with buildings 500. A driver has controlled the vehicle combination 1 so as to turn from a road 600 passing close to the area with buildings 500, and moved forward into the area with buildings 500. To get out of the area, the vehicle combination has to be moved in reverse. Thus, in this example, restrictions for the vehicle combination movements are given by buildings 500. It should however, be noted that the invention is equally applicable to situations where other types of objects form such restrictions, such as curbs, parked vehicles, or a road side of a road in a rural area.

Figure 4:
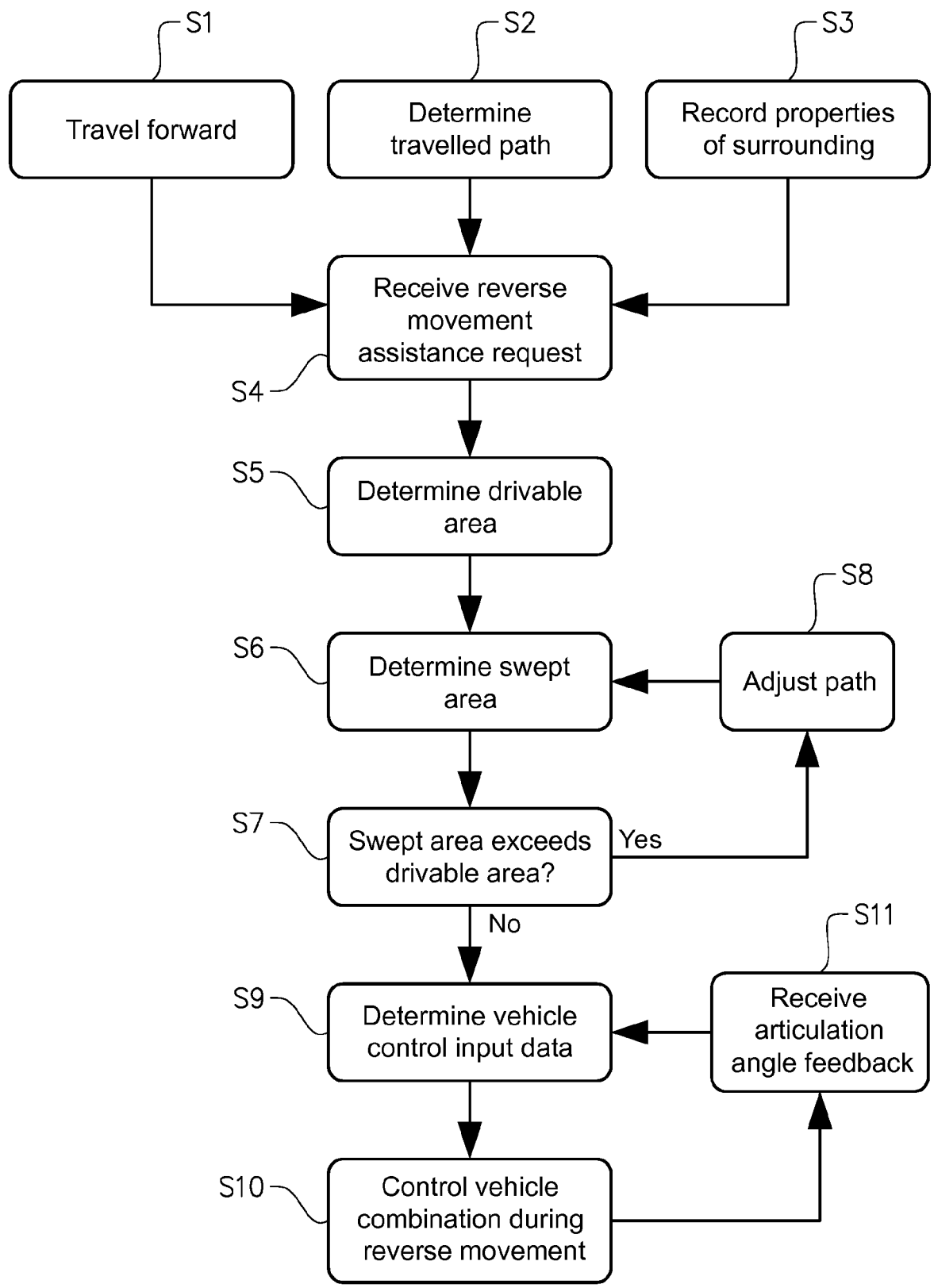
FIG. 4 is a block diagram depicting steps in a method according to an embodiment of the invention.

Below, a method according to an embodiment of the invention will be described with reference to FIG. 4.

The device for reversing the vehicle combination comprises means, for recording and storing global positions, G1 ... GN, of a local position LP of the vehicle combination 1, in the form of a GPS (Global Positioning System) device and the control unit CU. Thereby, when the vehicle combination 1 is moving forward S1, the control unit CU receives and stores data representing a plurality of global positions, G1, ... GN, of the local position LP of the vehicle combination 1. It is understood that the global positions, G1, ... GN, are fixed in relation to the surroundings, i.e. they are expressed in global coordinates. The local position LP is fixed in relation to the semitrailer 4. The local position LP is a position at a rearmost axle of the vehicle combination, in this example the virtual axle 9 (FIG. 1) of the semitrailer. It should be noted that other positions of vehicle combination can be used as a local position for the vehicle model. In this example, the global positions, G1, ... GN, are determined at a predetermined frequency.

Referring also to FIG. 2, the control unit also includes a vehicle state observer for determining the global positions, G1, ... GN. The vehicle state observer uses the vehicle model in combination with sensor inputs corresponding to, for example, the steering wheel angle δ, the yaw rate of the towing vehicle $d\Theta 1/dt$, wheel speeds of towing vehicle and towed vehicles, articulation angles $\Phi 1$, $\Phi 2$ of each articulation joint, and a position signal from the global positioning system (GPS). The vehicle state observer is further arranged to determine a plurality of directions of movement of the local position LP during the forward movement. For this the GPS device of the towing vehicle 2 has two spaced-apart antennas. Further sensor inputs for the vehicle model advantageously includes a vehicle speed sensor input and articulation angles of the GPS antennas. The vehicle state observer may be a pure model based observer with updated information, or it may include a Kalman filter.

Below equations are provided, including the parameters indicated in FIG. 2. The global positions, G1, ... GN, may be expressed by the parameters x3, y3. The global positions, G1, ... GN, are recorded at a predefined rate. The predefined rate may depend on distance or on time. In this way, global positions are recorded with specific distance intervals or specific time intervals.

As indicated in FIG. 3, based on the global positions, G1, ... GN, a travelled path TP is determined S2 with a suitable mathematical interpolation algorithm.

The device for reversing the vehicle combination also comprises a sensor 20. As can be seen in FIG. 1, in this example, the towing vehicle 2 comprises the sensor, here in the form of a so called time-of-flight (ToF) camera 20, known per se as a range imaging camera system that resolves distance based on the known speed of light, measuring the time-of-flight of a light signal between the camera and the subject for each point of the image. The sensor 20 is mounted in the front of the towing vehicle 2, and is adapted to record S3 during forward movement the vehicle combination 1, properties of the surroundings. Various alternative arrangements of the ToF camera 20 are possible, in which the camera 20 can make observations in the forward direction, and possibly in sideways and/or reverse directions as well. It should be noted that some other suitable type of sensor can be used for the invention, such as a stereo camera, a laser scanner, e.g. for Lidar, a radar and/or two acoustic arrays.

Reference is made also to FIG. 3. Signals from the sensor 20 are received and stored by the control unit CU. The control unit CU determines based on the signals from the sensor 20 locations of points 501 of limitations of a driveable area, in turn determined as described below. Properties of surroundings, such as asphalt, grass, curbs, buildings and other obstacles, are identified by a signal analysis function, in the form of an image analysis function, of the control unit CU. Of course, in alternatives with other sensor types, e.g. Lidar or radar, the signal analysis function of the control unit CU is adapted to signals from the used sensor type.

Upon such analysis the control unit determines the positions, expressed in global coordinates, of the limitation points 501. Such limitation points 501 can be selected based on a number of criteria, e.g. locations on detected obstacles being closest to the travelled path TP. The limitation points 501, some of which in FIG. 3 represent corners of the buildings 500 and other represent limitations between such corners, form limitations of the drivable area, and they are stored by the control unit as the vehicle combination travels forward.

The sensor 20 might be adapted to record information at repeated instances separated by time intervals. A frequency of such recordings might be predetermined. For example, the recordings might be made at the same frequency as that of the determination of the global positions, G1, ... GN. This might be particularly useful when travelling on a road outside of urban areas.

Thus, the signals from the sensor 20 are "distilled" by the control unit to produce point coordinates, e.g. on the sides of the path travelled by the vehicle combination 1. As a result, compared to storing the raw signals of the sensor, the amount of data to be stored can be reduced considerably which makes it possible to save data over long driving distances without need for any excessive data storage capacity.

In this example, in the situation shown in FIG. 3, the vehicle combination 1 needs to be moved in reverse to get back to the road 600. The driver of the vehicle combination 1 requests S4, by pressing a control button signalling to the control unit CU, reverse movement assistance. Upon such a request, the control unit CU determines vehicle control input data for the reverse manoeuvre, to which feedback data is added during the reversing itself as described closer below.

As a part of determining the vehicle control data, the control unit determines, based on the stored global positions, G1, ... GN, and the set of data, in this example the limitation points 501, representing the properties of the surroundings, a drivable area DA is determined S5. The drivable area determination includes in this example determinations of limitation lines 502 (FIG. 3) by interpolating the limitation points 501. More specifically, the driveable area DA is determined as an area including the travelled path TP and delimited by the limitation lines 502. Said interpolation may be made with straight lines between the limitation points, or it could be a polynomial interpolation.

In addition, along the travelled path, a drivable path width DW may be determined based on the limitation lines 502. The drivable path width DW may for example be the shortest distance between two opposing limitation lines 502 on either side of the travelled path, as indicated by way of example in FIG. 3.

As a further part of determining the vehicle control data, the control unit simulates a reverse movement of the vehicle combination 1. The simulated movement is such that the local positon LP (FIG. 2) moves along the global positions, G1, ... GN (FIG. 3). Based on the simulated reverse movement, a swept area SA of the vehicle combination is determined S6. The swept area is the area passed by any part of the vehicle combination during movement thereof. The simulated reverse movement and the swept area SA are determined with the equations below.

The following equations describe the state of the vehicle combination with parameters as indicated in FIG. 2, and the global positions, G1, ... GN, expressed by the parameters x3, y3. It should be noted that in FIG. 2, C1 is the longitudinal distance from the virtual axle 13 of the first vehicle unit 2 to the first articulation joint 5. C2 is the longitudinal distance from the virtual axle 6 of the first towed vehicle unit 3 to the second articulation joint 8.

$$\dot{x}_3 = v_1 \cos\phi_1 \cos$$

$$\phi_2 \left(1 - \frac{C_1}{L_{eq,1}}\tan\phi_1\tan\delta + \frac{C_2}{L_{eq,2}} + \tan\phi_1\tan\phi_2 + \frac{C_1 C_2}{L_{eq,1}L_{eq,2}}\tan\phi_2\tan\delta\right)$$

$$\cos\theta_3$$

$$\dot{y}_3 = v_1 \cos\phi_1 \cos\phi_2 \left(1 - \frac{C_1}{L_{eq,1}}\tan\phi_1\tan\delta + \right.$$

$$\left. \frac{C_2}{L_{eq,2}}\tan\phi_1\tan\phi_2 + \frac{C_1 C_2}{L_{eq,1}L_{eq,2}}\tan\phi_2\tan\delta\right)\sin\theta_3$$

$$\dot{\theta}_3 = v_1\left(-\frac{1}{L_{eq,3}}\cos\phi_1\sin\phi_2 + \frac{C_1}{L_{eq,1}L_{eq,3}}\sin\phi_1\sin\phi_2\tan\delta + \right.$$

$$\left. \frac{C_2}{L_{eq,2}L_{eq,3}}\sin\phi_1\cos\phi_2 + \frac{C_1 C_2}{L_{eq,1}L_{eq,2}L_{eq,3}}\cos\phi_1\cos\phi_2\tan\delta\right)$$

$$\dot{\phi}_1 = v_1\left(-\frac{1}{L_{eq,1}}\tan\delta - \frac{1}{L_{eq,2}}\sin\phi_1 - \frac{C_1}{L_{eq,1}L_{eq,2}}\cos\phi_1\tan\delta\right)$$

$$\dot{\phi}_2 = v_1\left(\frac{1}{L_{eq,2}}\sin\phi_1 + \frac{C_1}{L_{eq,1}L_{eq,2}}\cos\phi_1\tan\delta - \right.$$

-continued $$\frac{1}{L_{eq,3}}\cos\phi_1\sin\phi_2 + \frac{C_1}{L_{eq,1}L_{eq,3}}\sin\phi_1\sin\phi_2\tan\delta +$$
$$\frac{C_2}{L_{eq,2}L_{eq,3}}\sin\phi_1\cos\phi_2 + \frac{C_1C_2}{L_{eq,1}L_{eq,2}L_{eq,3}}\cos\phi_1\cos\phi_2\tan\delta\Bigg)$$

Below, the letter "n" denotes the number of the vehicle unit in the vehicle combination. Based on the effective wheel base Leqn of the nth vehicle unit, the orientations Θn, Θn−1 of the nth and (n−1)th vehicle units, and the longitudinal distances Cn, C(n−1) from the respective virtual axles of the nth and (n−1)th vehicle units to the nth and (n−1)th articulation joints, the positions of the virtual axles 6, 9, 13 (FIG. 1) can be calculated by $$x_{n-1} = L_{eqn}\cos\theta_n + C_{(n-1)}\cos\theta_{n-1} + x_n$$

$$y_{n-1} = L_{eqn}\sin\theta_n + C_{(n-1)}\sin\theta_{n-1} + y_n$$

From these axle positions, calculated for the simulated reverse movement where the local positon LP (FIG. 2) moves along the global positions, G1, . . . GN (FIG. 3), expressed by the parameters x3, y3, and a plurality of dimensions of the vehicle combination 1, the swept area SA of the vehicle combination 1 is determined.

Figure 5:
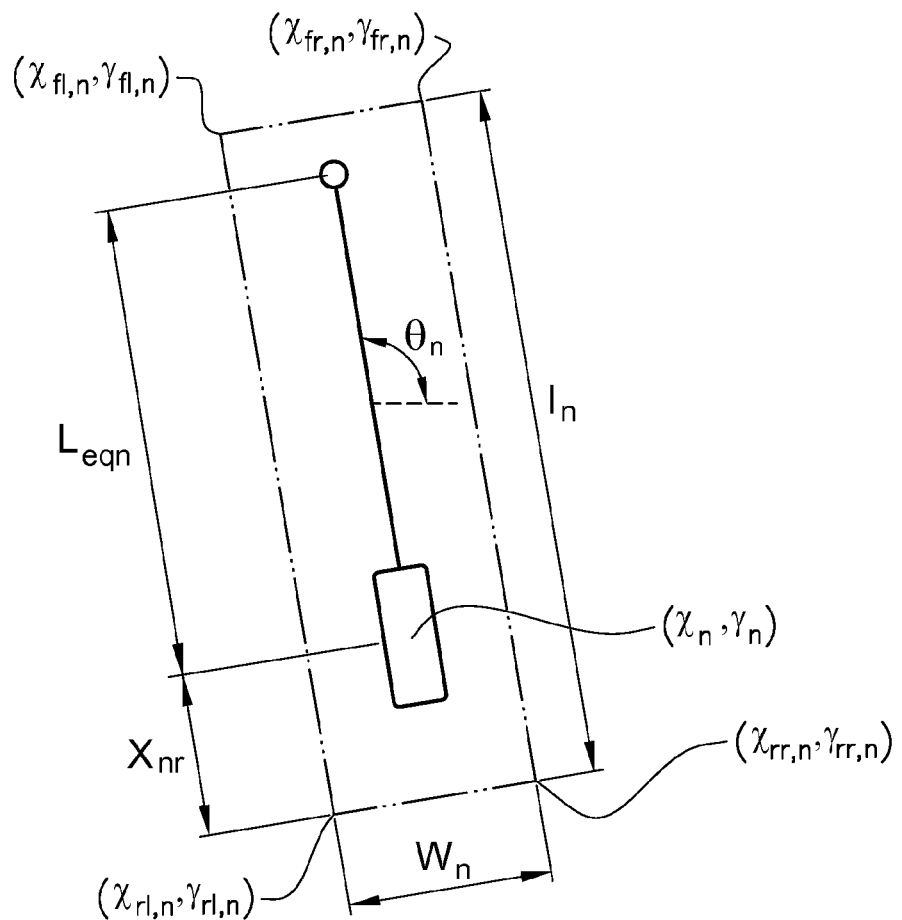
FIG. 5 shows a model of a vehicle unit of the vehicle combination in FIG. 1, with data on dimensions of the vehicle unit.

Reference is made also to FIG. 5. The vehicle combination dimensions are pre-stored by the control unit CU in the form of models of the vehicle units 2, 3, 4, as shown in FIG. 5. ln is the total length of the nth vehicle unit. Wn is the width of the nth vehicle unit. Leqn is the effective wheel base of the nth vehicle unit. Xnr is the longitudinal distance from the virtual axle of the nth vehicle unit to the rear end of the nth vehicle unit. It should be noted that such dimensions, e.g. the wheelbases, may also be estimated after certain forward driving of the vehicle combination.

The positions of the corners of each vehicle unit 2, 3, 4 are determined from the following equations, where Θn is the yaw angle of the nth vehicle unit, xn and yn are coordinates of the virtual axle of the nth vehicle unit, and xfl,n, yfl,n, xfr,n, yfl,n, xrl,n, yrl,n, xrr,n and yrr,n are coordinates of the corners of the nth vehicle unit:

$$x_{rl,n} = x_n - x_{nr}\cos\theta_n - \frac{w_n}{2}\sin\theta_n$$

$$x_{rr,n} = x_n - x_{nr}\cos\theta_n + \frac{w_n}{2}\sin\theta_n$$

$$x_{fl,n} = x_n + (l_n - x_{nr})\cos\theta_n - \frac{w_n}{2}\sin\theta_n$$

$$x_{fr,n} = x_n + (l_n - x_{nr})\cos\theta_n + \frac{w_n}{2}\sin\theta_n$$

$$y_{rl,n} = y_n - x_{nr}\sin\theta_n + \frac{w_n}{2}\cos\theta_n$$

$$y_{rr,n} = y_n - x_{nr}\sin\theta_n - \frac{w_n}{2}\cos\theta_n$$

$$y_{fl,n} = y_n + (l_n - x_{nr})\sin\theta_n + \frac{w_n}{2}\cos\theta_n$$

$$y_{fr,n} = y_n + (l_n - x_{nr})\sin\theta_n - \frac{w_n}{2}\cos\theta_n$$

Once the swept area SA for the simulated reverse movement of the vehicle combination 1 has been determined, S6, it is determined whether the swept area SA exceeds the drivable area DA, S7. In FIG. 3, a region where the swept area exceeds the drivable area DA, as an example, is indicated with an arrow E.

Figure 6:
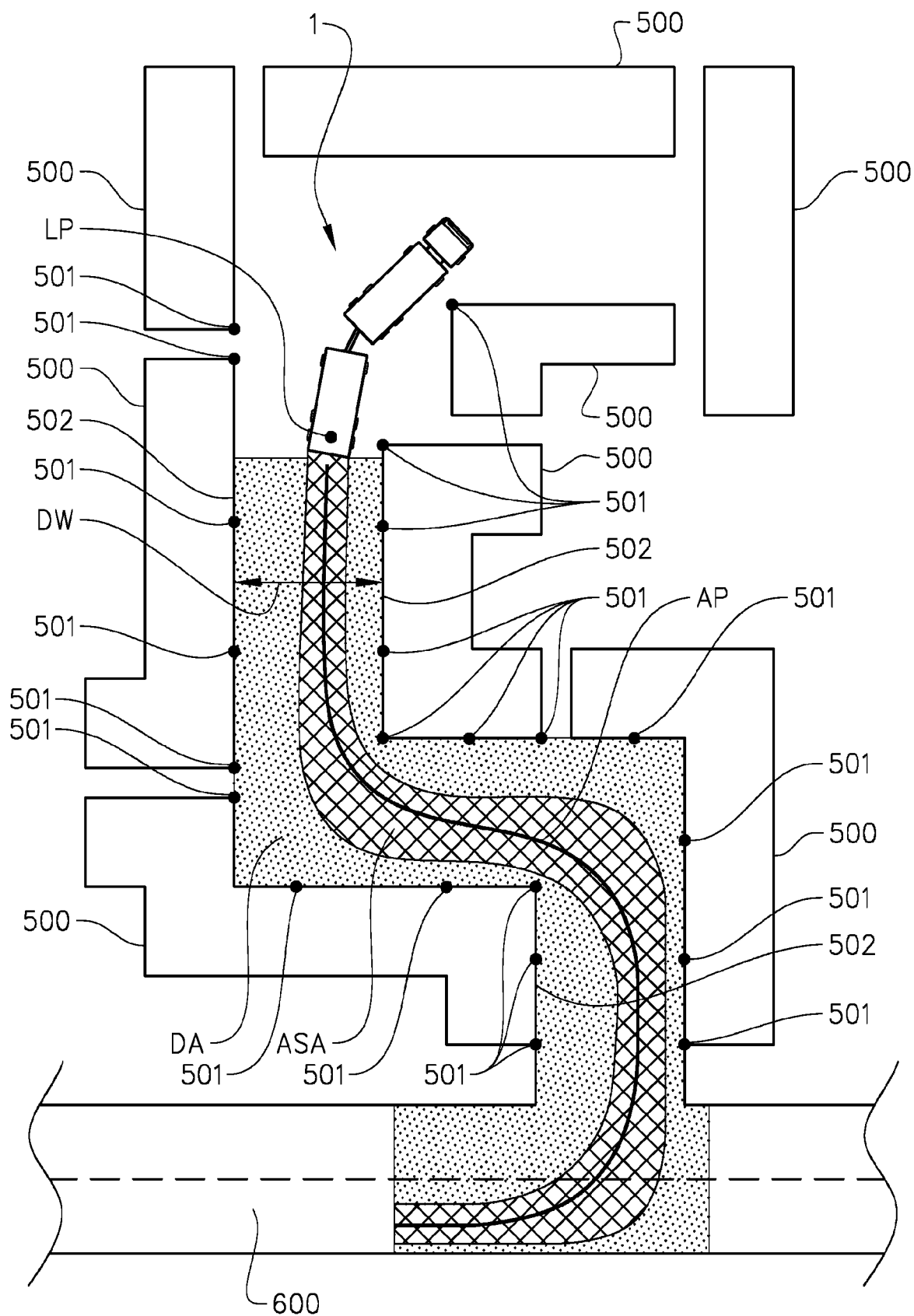
FIG. 6 shows the same view as FIG. 3 after an adjustment of a parameter used on the method depicted in FIG. 4.

Reference is made to FIG. 6. If the swept area SA exceeds the drivable area DA, the simulated reverse movement is adjusted. The adjusted reverse movement is based on an adjustment S8 of the path to be travelled by the local position LP, i.e. the rearmost virtual axle 9 of the vehicle combination 1. This path adjustment produces an adjusted path AP which differ from the travelled path TP. An adjusted swept area ASA is determined S6 based on the adjusted reverse movement.

Thus, the adjusted path AP differs from the travelled path TP, which was determined during the forward movement of the vehicle combination 1. The reason is that the swept area of the vehicle combination 1 during its forward movement differs from the swept area SA determined for the simulated reverse movement along the travelled path TP. The reason is that during the reverse movement, due to the articulation of the vehicle combination 1, steering adjustments are needed to keep the rearmost axle 9 on the travelled path TP. Such steering adjustments will in turn provide a swept area SA which may exceed the swept area during the forward movement.

For an illustration of the problem solved, a trailer of a forwards moving vehicle combination with only two vehicle units may be compared to a pendulum, which will be stable and biased by gravity towards a vertical position with a fixed articulation joint. However, when the vehicle combination moved rearwards, the trailer will behave like an elongated object supported only at its lower end with an articulated joint. Thereby, the joint needs sideways movements to counteract tendencies of the object to fall over. In a similar way the steering of the towing vehicle needs to be actuated to counteract tendencies of the trailer to move away from the desired path. The problem will be aggravated in a vehicle unit with three vehicle units as in the example described above.

Once the adjusted swept area ASA for the adjusted simulated reverse movement along the adjusted path AP has been determined, it is determined whether the adjusted swept area ASA exceeds the drivable area DA, S7.

If the adjusted swept area ASA exceeds the drivable area DA, the path to be travelled, and the simulated reverse movement, are once again adjusted, S8, and a further adjusted swept area is determined S6, which is in turn subjected to a determination whether it exceeds the drivable area S7.

If needed the requested automated reversing motion can include small forward driving corrections to be able to fit the adjusted swept area ASA within the drivable area DA. For example, the simulated reverse movement may be divided into two or more parts, and consecutive parts of the simulated reverse movement may be connected by a forward movement. Thus, a first reverse movement of the vehicle combination with control by the vehicle control input data could be followed by a forward movement, shorter than the first reverse movement, which in turn is followed by a second reverse movement.

Reference is made also to FIG. 1. If the adjusted swept area ASA does not exceed the drivable area DA, the control unit starts determining S9 the vehicle control input data for the reverse movement. The towing vehicle 2 comprises actuators for steering the wheels of the front axle 12, for controlling a propulsion unit in the form of an engine of the towing vehicle 2, and for controlling brakes of the towing vehicle 2. Such actuators are well known per se, and are not described in detail here. For simplification of this presentation, the actuators are depicted in FIG. 1 by a rectangle 30 with broken lines.

The vehicle control input data provides input signals for the control unit CU to autonomously control S10 the vehicle combination 1 during the reverse movement via the actuation devices 30. During the reverse movement vehicle control input data is updated based on feedback S11 from the sensors for the articulation angles Φ1, Φ2 (FIG. 2). The execution of the reversal movement along a simulated path is in this example done autonomously by the control unit CU with the actuators 30 providing steer control and cruise control, e.g. at constant low speed, with stops and changes of speed and direction were needed.

It is understood that where the towed vehicle units comprises steerable wheels, an autonomous control of the vehicle combination by the control unit CU may include control of actuators for such steerable wheels.

As an alternative to an autonomous control of the control unit CU, at least a part of the vehicle control input data could be provided for a visual and/or audible presentation to the driver of the vehicle combination 1. In such an alternative, there could be an autonomous control of the driver, or a semi-autonomously control of the control unit CU. In some embodiments, the steering could be controlled by the control unit CU, and the propulsion and braking could be controlled by the driver.

The invention claimed is:

1. A device for reversing an articulated vehicle combination comprising: at least two vehicle units interconnected via at least one articulated joint, comprising: means for recording and storing a plurality of global positions of a local position of the vehicle combination, at least one sensor, mounted on the vehicle combination, for recording data representing a plurality properties of the surroundings, and a control unit arranged to determine, based at least partly on a plurality of dimensions of the vehicle combination, a set of global positions recorded when the vehicle combination is moving forward, and a set of data representing properties of the surroundings recorded during the forward movement, vehicle control input data for control of the vehicle combination during a reverse movement of the vehicle combination, the control unit is adapted to identify properties of the surroundings, including asphalt and grass, by a signal analysis function, in the form of an image analysis function, in that the control unit is arranged to determine a swept area of the vehicle combination based at least on the set of global positions, and to determine the vehicle control input data partly based on the swept area, and in that the control unit is arranged to simulate a reverse movement of the vehicle combination, and to determine the swept area partly based on the simulated reverse movement.

2. A device according to claim 1, wherein the global positions are fixed in relation to the surroundings and the local position is fixed in relation to one of the vehicle units.

3. A device according to claim 1, wherein the local position is a position at a rearmost axle of the vehicle combination.

4. A device according to claim 1, wherein the control unit is arranged to determine a traveled path based on the set of global positions, and to determine the vehicle control input data partly based on the traveled path.

5. A device according to claim 1, wherein the simulated reverse movement is such that the local position moves along the global positions.

6. A device according to claim 1, wherein the control unit is arranged to determine a drivable area or at least one limitation of a drivable area based at least on die set of global positions and the set of data representing properties of the surroundings, and to determine the vehicle control input data partly based on the drivable area or the at least one limitation of the drivable area.

7. A device according to claim 6, wherein the control unit is arranged to determine whether the swept area exceeds the drivable area, or to determine whether the swept area interferes with at least one of the at least one drivable area limitation.

8. A device according to claim 6, wherein the control unit is arranged to determine whether the swept area exceeds the drivable area, or to determine whether the swept area interferes with at least one of the at least one drivable area limitation, the control unit further being arranged to adjust the simulated reverse movement or to simulate a different reverse movement if the swept area exceeds the drivable area or if the swept interferes with at least one of the at least one drivable area limitation.

9. A device according to claim 1, comprising means for recording a plurality of articulation angles of each articulated joint, wherein the control unit is arranged to determine the vehicle control input data partly based on a set of articulation angles.

10. A device according to claim 1, wherein the control unit is arranged to determine a set of directions of movement of the local position during the forward movement, and to determine the vehicle control input data partly based on the set of directions of movement.

11. A device according to claim 1, comprising means for providing, by a visual and/or audible presentation, at least a part of the vehicle control input data to a driver of the vehicle combination.

12. A device according to claim 1, wherein the at least one sensor comprises a time-of-flight camera, a stereo camera, a radar and/or a laser scanner.

13. A device according to claim 1, wherein the at least one sensor comprises at least one, preferably two acoustic arrays.

14. A vehicle comprising a device according to claim 1.

15. A device for reversing an articulated vehicle combination comprising: at least two vehicle units interconnected via at least one articulated joint, comprising: means for recording and storing a plurality of global positions of a local position of the vehicle combination, at least one sensor, mounted on the vehicle combination, for recording data representing a plurality properties of the surroundings, and a control unit arranged to determine, based at least partly on a plurality of dimensions of the vehicle combination, a set of global positions recorded when the vehicle combination is moving forward, and a set of data representing properties of the surroundings recorded during the forward movement, vehicle control input data for control of the vehicle combination during a reverse movement of the vehicle combination, wherein the control unit is adapted to identify properties of the surroundings, including asphalt and grass, by a signal analysis function, in the form of an image analysis function, and in that the control unit is arranged to determine a drivable path width based at least on the set of global positions and the set of data representing properties of the surroundings, and to determine the vehicle control input data partly based on the drivable path width.

16. A device for reversing an articulated vehicle combination comprising: at least two vehicle units interconnected via at least one articulated joint, comprising: means for recording and storing a plurality of global positions of a local position of the vehicle combination, at least one sensor, mounted on the vehicle combination, for recording data representing a plurality properties of the surroundings, and a control unit arranged to determine, based at least partly on a plurality of dimensions of the vehicle combination, a set of global positions recorded when the vehicle combination is moving forward, and a set of data representing properties of the surroundings recorded during the forward movement, vehicle control input data for control of the vehicle combination during a reverse movement of the vehicle combination, wherein the control unit is adapted to identify properties of die surroundings, including asphalt and grass, by a signal analysis function, in the form of an image analysis function, and in that the control unit is arranged to control the vehicle combination during the reverse movement of the vehicle combination autonomously or semi-autonomously via at least one actuation device.

17. A method for reversing an articulated vehicle combination comprising: at least two vehicle units interconnected via at least one articulated joint, comprising: storing data representing a plurality of global positions of a local position of the vehicle combination, recorded when the vehicle combination is moving forward, storing a set of data representing a plurality of properties of the surroundings, recorded during the forward movement the vehicle combination by means of at least one sensor mounted on the vehicle combination, and determining, based at least partly on a plurality of dimensions of the vehicle combination, the global positions, and the set of data representing the properties of the surroundings, vehicle control input data for control of the vehicle combination during a reverse movement of the vehicle combination, comprising identifying properties of the surroundings, including asphalt and grass, by a signal analysis function, in the form of an image analysis function, determining a swept area of the vehicle combination based at least on the global positions wherein the determination of the vehicle control input data is done partly based on the swept area, and simulating a reverse movement of the vehicle combination, wherein the swept area is determined partly based on, the simulated reverse movement.

18. A method according to claim 17, wherein the global positions are fixed in relation to the surroundings and, the local position is fixed in relation to one of the vehicle units.

19. A method according to claim 17, wherein the local position is a position at a rearmost axle of the vehicle combination.

20. A method according to claim 17, comprising determining a traveled path based on the plurality of global positions, wherein the determination of the vehicle control input data is done partly based on the traveled path.

21. A method according to claim 17, wherein the simulated reverse movement is such that the local position moves along the global positions.

22. A method according to claim 17, comprising determining based at least on the global positions and the set of data representing the properties of the surroundings, a drivable area or at least one limitation of a drivable area, wherein the determination of the vehicle control input data is done partly based on the drivable area or the at least one limitation of the drivable area.

23. A method according to claim 22, comprising determining whether the swept area exceeds the drivable area, or determining whether the swept area interferes with at least one of the at least one drivable area limitation.

24. A method according to claim 22, comprising determining whether the swept area exceeds the drivable area, or determining whether the swept area interferes with at least one of the at least one drivable area limitation, and adjusting the simulated reverse movement or simulating a different reverse movement if the swept area exceeds the drivable area or if the swept interferes with at least one of the at least one drivable area limitation.

25. A method according to claim 17, comprising the further steps of receiving data representing a plurality of articulation angles of each articulated joint, wherein the determination of the vehicle control input data is done partly based on the articulation angles.

26. A method according to claim 17, comprising the further steps of determining a plurality of directions of movement of the local position during the forward movement, wherein the vehicle control input data is based partly on the directions of movement.

27. A method according to claim 17, comprising providing at least a part of the vehicle control input data for a visual and/or audible presentation to a driver of the vehicle combination.

28. A method according to claim 17, wherein an earliest of the stored global positions is recorded at a beginning of a first time interval and a latest of the global positions is recorded at an end of the first time interval, and the properties of the surroundings are recorded within the first time interval.

29. A method according to claim 28, wherein the forward movement of the vehicle combination ends at the end of the first time interval, and a reverse movement follows the forward movement without any intermediate movement.

30. A computer comprising a computer program for performing the steps of claim 17 the program is run on the computer.

31. A non-transitory computer readable medium carrying a computer program for performing the steps of claim 17 when the program product is run on a computer.

32. A control unit for controlling an articulated vehicle combination, the control unit being configured to perform the steps of the method according to claim 17.

33. A method for reversing an articulated vehicle combination comprising: at least two vehicle units interconnected via at least one articulated joint, comprising: storing data representing a plurality of global positions of a local position of the vehicle combination, recorded when the vehicle combination is moving forward, storing a set of data representing a plurality of properties of the surroundings, recorded during the forward movement the vehicle combination by means of at least one sensor mounted on the vehicle combination, and determining, based at least partly on a plurality of dimensions of the vehicle combination, the global positions, and the set of data representing the properties of the surroundings, vehicle control input data for control of the vehicle combination during a reverse movement of the vehicle combination, comprising identifying properties of the surroundings, including asphalt and grass, by a signal analysis function, in the form of an image analysis function, and determining a drivable path width based at least on the global positions and the set of data representing the properties of the surroundings, wherein the determination of the vehicle control input data is done partly based on the drivable path width.

34. A method for reversing an articulated vehicle combination comprising at least two vehicle units interconnected via at least one articulated joint, comprising storing data representing a plurality of global positions of a local position of the vehicle combination, recorded when the vehicle combination is moving forward, storing a set of data representing a plurality of properties of the surroundings, recorded during the forward movement the vehicle combination by means of at least one sensor mounted on the vehicle combination, and determining, based at least partly on a plurality of dimensions of the vehicle combination, the global positions, and the set of data representing the properties of the surroundings, vehicle control input data for control of the vehicle combination during a reverse movement of the vehicle combination, comprising identifying properties of the surroundings, including asphalt and grass, by a signal analysis function, in the form of an image analysis function, wherein the determination of the vehicle control input data is done by a control unit of the vehicle combination, and controlling the vehicle combination during the reverse movement of the vehicle combination comprises the control unit providing at least a pan of the vehicle control input data for an autonomously or semi-autonomously control of the vehicle combination via at least one actuation device.

\* \* \* \* \*